Sept. 12, 1967 L. V. CHANDLER 3,340,742
VIBRATORS
Filed March 10, 1965 2 Sheets-Sheet 1
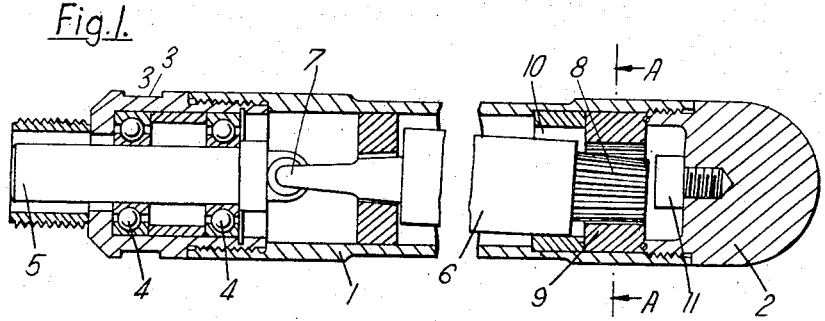
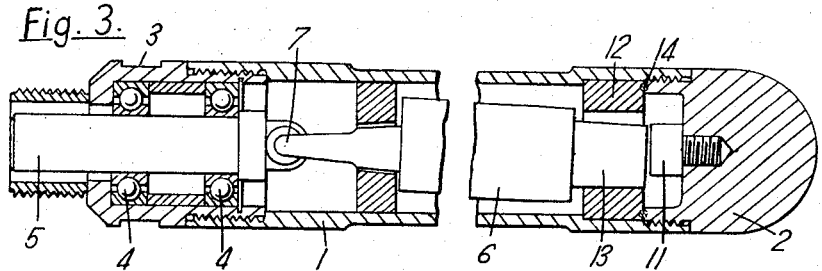
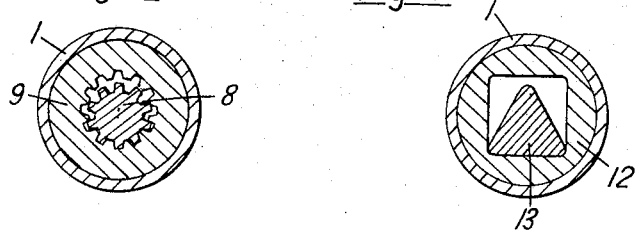
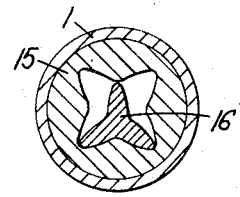
Inventor
LESLIE VIVIAN CHANDLER
By Irwin S. Thompson
Attorney Sept. 12, 1967   L. V. CHANDLER   3,340,742
VIBRATORS
Filed March 10, 1965   2 Sheets-Sheet 2

Inventor
LESLIE VIVIAN CHANDLER
By Irwin S. Thompson
Attorney

United States Patent Office 3,340,742
Patented Sept. 12, 1967

3,340,742
VIBRATORS
Leslie Vivian Chandler, Surbiton, England, assignor to Fyne Machinery and Engineering Limited, London, England
Filed Mar. 10, 1965, Ser. No. 438,572
Claims priority, application Great Britain, Mar. 25, 1964, 12,603/64
11 Claims. (Cl. 74—87)

ABSTRACT OF THE DISCLOSURE

A concrete-mix vibrator comprises a cylindrical casing in which rolls a driven cylindrical rotor having some degree of lateral freedom in the casing, but being at one end, or at each end, in inseparable engagement with the casing by a gear-like coupling between cooperating teeth, ribs or vanes, and alcoves or recesses, providing a step-up driving ratio.

---

This invention relates to vibrators comprising a body rotatable eccentrically in an outer casing.

One use for a vibrator of this kind is in a device for either immersion or surface vibration of concrete mixes in order to agitate or compact the mix with the object of consolidation to a voidless state.

Vibrators of the aforesaid kind are also used for other industrial purposes, e.g. for causing vibrations in conveyors, screen hoppers, or the like, and the invention is applicable to vibrators used for all such purposes.

It has been found that vibrators utilising a rolling member to impart out-of-balance forces, frequently need tapping to introduce the tractive friction to start, and are prone to develop slip if other than dry clean conditions exist inside the casing. In consequence they necessarily depend upon efficient seals between the lubricated drive shaft and the dry chamber.

The object of the invention is to provide a vibrator incorporating means for ensuring positive commencement of vibration and elimination of any slip during operation, thus ensuring positive vibration frequency and relationship between driven speed and circuits of the rotating shaft.

With this end in view the invention consists in a vibrator comprising a mass rotatable out-of-balance in a casing, wherein coacting parts of the rotatable mass and the casing are formed or shaped for positive engagement to reduce or eliminate relative slip.

A part e.g. the inner end, of the rotatable mass may be formed with teeth or corners adapted to engage with cooperating grooves or recesses inside the casing.

Such an arrangement while ensuring positive roll between the rotor and casing permits adequate lubrication of all working parts without detriment to operation of the device.

The invention will be clearly understood from the following description of one form (given, however, merely by way of example) which it may assume, and this description will be more readily followed by reference to the accompanying drawings, wherein:

FIGURE 1 represents an axial section of a concrete vibrator incorporating the invention;

FIGURE 2 represents a transverse section along the line A—A of FIGURE 1;

FIGURES 3 and 4 represent views, corresponding to those of FIGURES 1 and 2, of another form of concrete vibrator in accordance with this invention;

FIGURE 5 represents an alternative transverse section of a vibrator which may be used in place of that shown in FIGURE 4.

Figure 6:
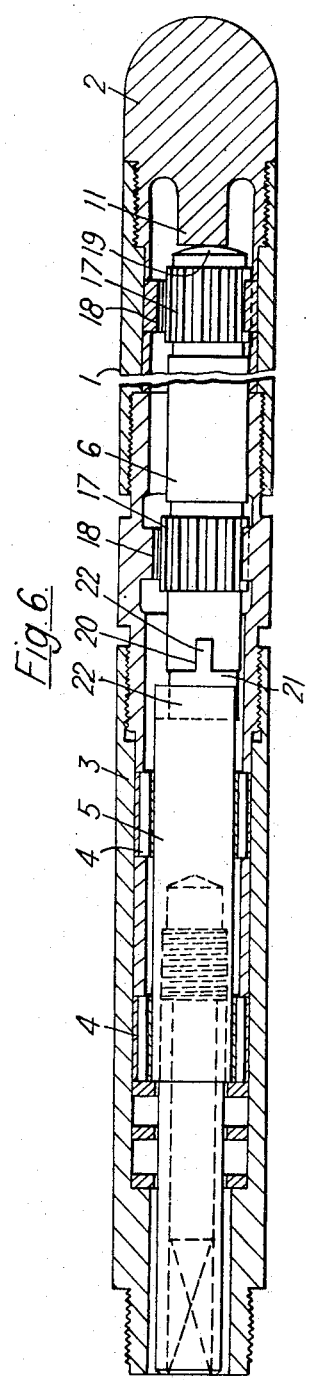
FIGURE 6 represents in axial section another form of vibrator in accordance with the invention.

In carrying the invention into effect in one convenient manner, as shown in FIGURES 1–5 of the aforesaid drawings, a concrete immersion vibrator may comprise a cylindrical casing 1 with a screwed-in nose 2, and screwed-in upper housing 3 for bearings 4 in which runs a driving shaft 5, adapted to be connected to driving means (e.g. a flexible driving coupling, not shown).

A rotor 6 is attached by a universal coupling 7 to the shaft 5, and the axis of the rotor body is inclined to the axis of the casing 1 so that the centre of gravity of the rotor is eccentric in the casing and when rotated the rotor sets up out-of-balance lateral forces.

In accordance with the invention means are provided to control the rolling of the rotor when rotated, and as shown in FIGURES 1 and 2 these means may comprise a pinion 8 at the free end of the rotor 6 which extends into and rides in an internally-toothed annular gear 9. In addition there is mounted inside the casing 1 a plain load track 10 against which rolls the free end of the rotor body. The tooth formation of the pinion 8 and gear 9 is such that the pinion cannot assume a free position but is constrained to follow a prearranged circuit when the rotor is driven. The track 10 takes the centrifugal load of the rotor and determines the depth of mesh engagement of the pinion 8 and 9. Internally on the nose piece 2 is secured a thrust pad 11.

It can be shown that the vibration frequency set up by the out-of-balance forces when the rotor is rotated is determined in accordance with the formula $$F = \frac{R \cdot N_p}{N_r - N_p}$$

where

F is the vibration frequency;
R is the number of revolutions per minute of the driving shaft 5;
$N_p$ is the number of pinion teeth;
$N_r$ is the number of gear ring teeth.

Thus if $N_p$ is 10 teeth and $N_r$ 12 teeth a 5:1 step-up ratio from driving rotation frequency to emitted vibration frequency is obtained. In this case the radii of the plain track 10 and the rotor 6 will be in the ratio of 6:5. Alternatively if $N_p$ is 14 teeth, a step-up ratio of 7:1 is obtained when $N_r$ is 16 teeth; and a step-up ratio of 15:1 when $N_p$ is 15 teeth.

While as shown the vibrating force component of the device, i.e. the rotor 6, may be connected to the input shaft 5 by a universal coupling 7, an alternative connection may be a flexible shaft or spring as the vibrator component rotates about its own axis at the driven speed (R) while gyrating at an increased cyclic frequency. The universal joint shown provides for the deflection and dimensional location desired, but other couplings which may be used may, for example, be a free ball joint and/or a coiled spring drive.

In alternative forms of vibrator in accordance with the invention the pinion 8 and gear ring 9 may be replaced by other forms of positive engaging and driving units, of which examples are shown in FIGURES 3, 4 and 5.

In FIGURES 3 and 4 there is shown fitted into the casing 1 a ring 12 having a substantially square bore in which is located a tapered projection 13 from the base of the rotor body which is of equilateral triangular cross-section. An O-ring 14 for oil-sealing is inserted between the ring 12 and nose piece 2, and the plain track 10 is omitted.

In another construction shown in FIGURE 5 a ring 15 (which replaces the ring 12) has four substantially triangular recesses forming a star-like aperture into which extends a projection 16 (replacing projection 13) having three equispaced ribs or vanes.

Various alternative shapes may be adopted in accordance with the principle that the ring (12 or 15) has one more side or recess than the number of sides, ribs, vanes or other projections on the rotating component.

It will be seen that when the rotor is driven the components referred to (e.g. 12 and 13, or 15 and 16) cause controlled gyratory movement of the rotor which set up high frequency vibrations, in much the same way as described above with reference to FIGURE 1.

The arrangements shown in FIGURES 3–5 have the additional feature of imparting impact forces additional to the centrifugal force and in the relation of one impact for each side of the rotor for each revolution about its own axis. For example a three sided rotor operating in a square will have a vibrating cycle of 3 times input speed plus an impact frequency of 12 times input speed. Thus for an input of 3,000 r.p.m. there will be 9,000 full cycle vibrations and 36,000 impact vibrations. The variation shown in FIGURE 5 affords impact frequency of 24 times input speed.

In a modified form of vibrator in accordance with the invention shown in FIGURE 6 of the aforesaid drawings the rotor 6 has positive engagement with the case 1 at both ends of the rotor. The axis of the rotor 6 is parallel to, but eccentric in relation to the axis of the casing 1, and at each end is formed or fitted with toothed gear members 17 engaged in toothed rings or sleeves 18 formed or fitted in the casing 1. The gear members 17 are of somewhat smaller diameter than the sleeves 18, and in cross-section each cooperating gear member 17 and sleeve 18 appears substantially as shown in FIGURE 2.

At its inner end the rotor 6 is domed as at 19 to bear on the thrust pad 11 while at its upper end it is formed with a transverse diametrical slot 20. A connector comprising a disc 21 having on opposite faces diametrical ribs 22 in planes perpendicular to one another couples the rotor 6 to the driving shaft 5, by engagement of one of the ribs 22 in the rotor slot 20, and engagement of the opposite rib 22 in a similar slot at the inner end of the driving shaft 5.

The shaft 5, when driven, sets the rotor 6 into motion, and by virtue of the positive couplings 17, 18 with the casing the rotor is immediately caused to rotate. Because of its eccentricity vibrations are immediately generated, as explained above. The connector coupling 20, 21, 22 allows relative transverse movements between the shaft 5 and rotor 6 necessary to maintain eccentricity of the rotor while continuously driven.

Form the above description it will be seen that the invention provides a simple and convenient vibrator which is positive in operation, and it should be understood that the invention is not limited to details of the forms described above, which may be modified, in order to meet various conditions and requirements encountered, without departing from the scope of the invention.

What I claim is:

1. A vibrator comprising a casing, an eccentric rotor housed in, and transversely movable relative to said casing, means for transmitting a drive to said rotor, and means providing a positive, non-disengageable gear-like coupling between said rotor and said casing, introducing a step-up ratio between the rotational frequency at which the rotor is driven, and the resulting vibrational frequency generated by the casing.

2. A vibrator comprising a casing, a rotor housed in said casing for eccentric rotation therein, means for connecting said rotor to a mechanical drive, a positive gear-like connection between an end of the rotor and the casing in the form of cooperating tooth-like projections and recesses, which introduce a step-up ratio between the rotational frequency at which the rotor is driven in the casing, and the vibrational frequency of the casing generated thereby, the said cooperating projections and recesses being formed to permit the rotor to move transversely relative to said casing, while preventing disengagement thereof.

3. A vibrator according to claim 2 comprising a substantially cylindrical rotor having means for connection to a mechanical drive at one end, and a projection for positive gear-like engagement with the casing at the other end.

4. A vibrator according to claim 2 wherein the part of the rotor which cooperates with the casing for gear-like connection therewith is removable and replaceable.

5. A vibrator according to claim 2 wherein the part of the casing which cooperates with the rotor for gear-like connection therewith is removable and replaceable.

6. A vibrator according to claim 2 wherein a projection at an end of the rotor has a cross-section of a geometrical figure of rectilinear sides providing a given number of corners, and the cross-section of the adjacent cooperating part of the casing is of a different geometrical figure of rectilinear sides providing a different number of corners.

7. A vibrator according to claim 2 wherein a toothed projection at an end of the rotor engages with an internally-toothed surrounding part of the casing.

8. A vibrator according to claim 2 comprising a rigid driving shaft mounted in bearings in the casing.

9. A vibrator according to claim 2 comprising mechanical drive means and a universal coupling between the rotor and the said mechanical drive means.

10. A vibrator according to claim 2 wherein each end of the rotor cooperates in gear-like engagement with the casing.

11. A vibrator according to claim 2 comprising as a coupling between said rotor and a mechanical driving shaft therefor a connector formed with ribs slidably engaging in traverse slots in the adjacent ends of the said rotor and said shaft.

References Cited

UNITED STATES PATENTS

| | | | |
|---|---|---|---|
| 1,549,555 | 8/1925 | Jorgensen | 74—87 |
| 2,198,148 | 4/1940 | Baily | 74—87 |
| 2,761,079 | 8/1956 | Giertz-Hedstrom et al. | 74—87 |
| 2,876,647 | 3/1959 | Petrin | 74—87 |

FRED C. MATTERN, Jr., *Primary Examiner.*

W. S. RATLIFF, *Assistant Examiner.*